United States Patent
Møgedal et al.

(10) Patent No.: US 8,057,126 B2
(45) Date of Patent: Nov. 15, 2011

(54) CONNECTOR MEANS

(75) Inventors: Knut Møgedal, Asker (NO); Sigvard Omvik, Moss (NO)

(73) Assignee: Aker Subsea AS, Lysaker (NO)

( * ) Notice: Subject to any disclaimer, the term of this patent is extended or adjusted under 35 U.S.C. 154(b) by 226 days.

(21) Appl. No.: 12/515,815

(22) PCT Filed: Nov. 21, 2007

(86) PCT No.: PCT/NO2007/000412
§ 371 (c)(1),
(2), (4) Date: May 21, 2009

(87) PCT Pub. No.: WO2008/063080
PCT Pub. Date: May 29, 2008

(65) Prior Publication Data
US 2010/0021238 A1 Jan. 28, 2010

(30) Foreign Application Priority Data
Nov. 22, 2006 (NO) .................................. 20065367

(51) Int. Cl.
*F16L 1/26* (2006.01)
(52) U.S. Cl. ...................................... 405/170; 405/169
(58) Field of Classification Search .................. 405/158, 405/169, 170, 172
See application file for complete search history.

(56) References Cited

U.S. PATENT DOCUMENTS

| | | | |
|---|---|---|---|
| 3,724,061 A | 4/1973 | Schipper | |
| 4,436,449 A * | 3/1984 | Smoot et al. | 405/170 |
| 4,493,590 A * | 1/1985 | Ayers et al. | 405/170 |
| 5,730,551 A * | 3/1998 | Skeels et al. | 405/170 |
| 5,807,027 A | 9/1998 | Östergaard | |
| 5,975,803 A * | 11/1999 | Mackinnon | 405/170 |
| 6,109,830 A * | 8/2000 | de Baan | 405/170 |
| 6,742,963 B2 * | 6/2004 | Bekkevold et al. | 405/170 |
| 6,767,165 B1 * | 7/2004 | Corbetta | 405/170 |
| 6,854,930 B2 * | 2/2005 | Pionetti | 405/172 |
| 6,997,645 B2 * | 2/2006 | von Trepka et al. | 405/170 |

(Continued)

FOREIGN PATENT DOCUMENTS

NO 316939 B1 6/2004

(Continued)

*Primary Examiner* — Frederick L Lagman
(74) *Attorney, Agent, or Firm* — Birch, Stewart, Kolasch & Birch, LLP (57) ABSTRACT

A connector means (10; 20) for tie-in and connecting of a first pipeline and a second pipeline on the seabed is shown. The connector means comprises a first connector part (1; 1') retaining a first end of the first pipeline. The first connector part and the first pipeline are designed to be lowered and deployed on the seabed in advance of the connecting operation. A submersible second connector part (2; 2') that retains a second end of the second pipeline (4) is also included. The second connector part and the second pipeline are designed to be lowered from the surface of the water toward the first connector part (1; 1'). The connector parts (1, 2; 1', 2') comprises means (6, 11; 21, 22) that cooperate during relative motion between said connector parts, and is hinged tilting the second connector part (2, 2') by means of forced motion, and thus aligning the second pipe end (4e, 4'e) in the direction toward the first pipe end (8e, 8'e) such that the first and second pipelines are brought to be in line with each other on the seabed. In addition a connector (3, 3') is arranged between the connector parts for final connection between the pipeline ends.

20 Claims, 8 Drawing Sheets

U.S. PATENT DOCUMENTS

| | | | |
|---|---|---|---|
| 7,086,807 B2 * | 8/2006 | Mackinnon | 405/170 |
| 7,402,000 B2 * | 7/2008 | Bastesen et al. | 405/170 |
| 7,600,569 B2 * | 10/2009 | Routeau et al. | 405/158 |
| 7,794,177 B2 * | 9/2010 | DeLack | 405/169 |
| 2007/0269270 A1 * | 11/2007 | Bastesen et al. | 405/170 |
| 2008/0014026 A1 | 1/2008 | Routeau et al. | |
| 2008/0193219 A1 * | 8/2008 | Luppi et al. | 405/168.1 |
| 2008/0286050 A1 * | 11/2008 | DeLack | 405/172 |

FOREIGN PATENT DOCUMENTS

| | | |
|---|---|---|
| WO | WO-2005/028810 A1 | 3/2005 |

* cited by examiner

CONNECTOR MEANS

The present invention relates to a connecting device for mating and making up a connection on the seabed of a first and a second pipeline having their respective first and second pipe end at the connection site, comprising:

a first connecting part retaining the first pipe end of the first pipeline, which first connecting part and first pipeline are designed to be lowered and deployed on the seabed in advance, and the first connecting part comprises a guiding structure that is spaced apart from the pipe end, and a second submersible connecting part that retains the second pipe end of the second pipeline, which second connecting part and second pipeline are designed to be lowered from the surface of the water toward the first connecting part, and the second connecting part comprises guiding means spaced apart from the pipe end.

Within this art of technique such type of connecting device concept is normally called GHO (Guide and Hinge Over), which in brief means that the one part of the connecting device that is lowered towards the seabed is "Guided" to the connecting site, and in the very last phase "Hinged Over" in order to align the pipeline ends to be connected, Such part of the connecting device is mounted to the end of a pipeline that is to be lowered from the surface in various positions between vertical and horizontal.

An early version of this type of connecting device is shown in Norwegian Patent no. 316939 having the same assignee as the present invention.

The now suggested solution is seen to represent a substantial potential to save costs. The costs per tie-in operation in the traditional way by use of ROV (Remote Operated Vehicle) supported systems, such as RTS, RovCon and Icarus, are in the order of magnitude NOK 3-500.000,00 (US$ 50-90.000) per connection. Having a full scale development project, the total costs of tie-in and mating tools can easily amount to NOK 10-30 millions depending of the number of connections that are to be made. In addition the availability of tools is a matter of its own, since most of the contractors only have 2-3 tool sets available.

The proposed arrangement represents a robust construction at low costs, which is designed to be a purchased item in stead of being based on leasing, as the case is for ROV based arrangements. In this way an operator can buy the number of connecting device sets, and possibly backup sets, as he regards to be necessary, to relatively moderate costs, and without any need to make special arrangements in order to secure availability for future operations.

Advantages with the New Connecting Device Are:
a) considerably reduced tool costs
b) no need to mobilize RTS tool, e.g. reduced mobilizing costs
c) availability of tools that are spread around is no longer any issue
d) virtually no need for storage space on board support ships
e) less down time due to simple construction
f) complete backup units can be present due to moderate costs, for example no waiting for repair in case of breakdown in equipment,
g) operating costs will be reduced because fewer operators are necessary; the crew can be restricted to one leader per shift
h) the extent of maintenance/service activities will be considerably reduced
i) eases the mating with the vessel and ROV
j) the tool package can fit to practically any ROV system
k) the pipe subs are located directly within the corresponding structure. No tie-in. winching operations are necessary.
l) fewer spare parts are necessary
m) prompt mobilizing (by air freight) is possible in emergency situations
n) reduced module/handling weights The Connecting Device also Entails Some Disadvantages that Are:
a) in difference from ROV assisted systems, which are neutral in water, this device will be exposed for heave motion induced by the vessel. Thus it will be more difficult to enter the guiding system. For shallow waters, however, it is also possible to use guide wire for better control.
b) one or another form for construction need to be in place in order to facilitate parking of the termination on the seabed (normally made possible in having the drilling template installed)
c) when using a RTS type connecting system, the jumpers are normally preinstalled on the seabed. The location of the termination heads needs to be relatively precise in order to avoid to high forces on the tool during tie-in. With the GHO system the jumper is positioned directly within the guiding system on the corresponding structure. The positioning accuracy necessary to hit the guiding system is approximately the same as the accuracy necessary for the placement of the jumper for RTS. This is thus not considered as a considerably disadvantage.

In accordance with the present invention a connecting device of the introductory said kind is provided, which is distinguished in that the connecting parts comprises means that cooperate during relative motion between said connecting parts, and hinged tilts the second connecting part by means of forced motion, and thus aligning the second pipe end in the direction toward the first pipe end such that the first and second pipelines are brought to be in line with each other on the seabed, and a connector arranged between the connecting parts for final connection between the pipeline ends.

In one embodiment the guiding structure can be a guide post optionally connected to a surface vessel via a guide line, said guide post being able to receive a corresponding guide means arranged on the second connecting part.

In one embodiment the forced motion means on the second connecting part can be a projecting bar which, in a slidable way, cooperate with a frame part on the first connecting part, said sliding cooperation tilts the second connecting part and thus the pipe end towards alignment of the pipelines.

In one embodiment the forced motion means on the second connecting part can be the said guiding means and the guiding means is fixedly connected to the projecting bar which, in a slidable way, cooperates with said frame part.

In one embodiment the forced motion means on the second connecting part can be fixedly connected to the second pipe end via a plate part that is secured substantially normally to the central axis of the pipe end.

In a second embodiment the guiding structure can be an upwardly projecting frame structure that is able to receive a corresponding guide means arranged on the second connecting part.

In the second embodiment the forced motion means on the second connecting part can include a projecting bail structure which, in an initial phase, in a slidable way cooperate with the upwardly projecting frame structure on the first connecting part, and when the bail structure is completely introduced into and bottoms against a part of the upwardly projecting frame structure, the second connecting part and thus the pipe end tilts in the direction towards alignment of the pipelines.

Suitably the forced motion means on the second connecting part can be fixedly connected to the second pipe end via a plate part that is secured substantially perpendicular to the central axis of the pipe end.

In one embodiment the connector can constitute an integrated part of the connecting device, the connector being secured on the second connecting part and the second connecting part is displaceable in a direction towards and away from the first connecting part, said pipe ends thus are positioned before final connection of the pipe ends by said connector.

In another embodiment the connector can still be an integrated part of the connecting device, but the connector is now secured on the first connecting part and the second connecting part is displaceable in a direction towards and away from the first connecting part, said pipe ends thus are positioned before final connection of the pipe ends by said connector.

In still another embodiment the connector can still be an integrated part of the connecting device, but the connector is secured on the second connecting part and the first connecting part is displaceable in a direction towards and away from the second connecting part, said pipe ends thus are positioned before final connection of the pipe ends by said connector.

In still another embodiment the connector can still be an integrated part of the connecting device, but the connector is secured on the first connecting part and the first connecting part is displaceable in a direction towards and away from the second connecting part, said pipe ends thus are positioned before final connection of the pipe ends.

In still another embodiment the connector can constitute a separate unit that can be lowered down between the pipe ends after the pipe ends are coarsely positioned and aligned relative to each other.

In one or more embodiments at least one connecting part can include orienting means that are able to turn the second connecting part in the horizontal plane to coarsely align the second connecting part in respect of the first connecting part such that the pipe ends thus are brought substantially in line before lowering of the second connecting part along said guide post.

Other and further objects, features and advantages will appear from the following description of a preferred embodiment of the invention, which is given for the purpose of description, and given in context with the appended drawings where.

With reference to the FIGS. 1-5, a first embodiment of the connecting device according to the invention, generally given the reference number 10, will now be described. The connecting device 10 consists of two main parts, the first connecting part 1 and the second connecting part 2, in addition to a connector 3. It is intended that the entire connecting device 10 is left alone on the seabed when the connecting operation between the two pipelines is completed. The pipelines can be rigid or flexible.

In the illustrated variant, the connector 3 is secured to the second connecting part 2 and constitutes per se an integrated part of the second connecting part 2. The second connecting part 2 also includes a second pipe end 4e which is the end of a second pipeline 4. The pipe end 4e is secured to a rigid and robust plate part 5 that also the connector 3 is fixed to. The plate part 5 is substantially perpendicular to the centre axis of the pipe end 4e.

In addition, the second connecting part 2 has forced motion means in the form of a projecting bar 6 which is rigidly connected to the plate part 5. The bar 6 is spaced apart from the pipe end 4e and extends substantially in parallel with the central axis of the pipe end 4e. The bar 6 includes guiding means in the form of funnel like means 7. Such means 7 may, in one variant, in addition to its main function, also act as guiding means along a guide line 13, or wire, that is connected to a surface vessel (not shown). It is, strictly speaking, not necessary with a guide line. This depends on the sea depth and climatic conditions like wind and rough seas. It is further to be understood that it will be possible to provide the bar 6 with the means 7 releasable secured to the plate part 5, such that this can be retrieved to the surface after installation. This is a question of costs related to what to be advantageous in each individual case.

The first connecting part 1 has a first pipe end 8e which is the end of the first pipeline (not shown). The pipe end 8e is secured to a rigid and robust plate part 9 which in turn is secured to a rigid and robust frame structure 11. The plate part 9 is perpendicular to the longitudinal extension of the frame construction 11 and the central axis of the pipe end 8e. The first connecting part 1 that rigidly retains the first pipe end 8e of the first pipeline includes an upwardly projecting guide structure in the form of a guide post 12 that is located and secured to the frame structure 11 at a distance from the pipe end 8e. The guide post 12 extends substantially vertically and in parallel with the plane through the plate part 9. A guide line 13, or wire, is in connection with a surface vessel (not shown).

Figure 1:
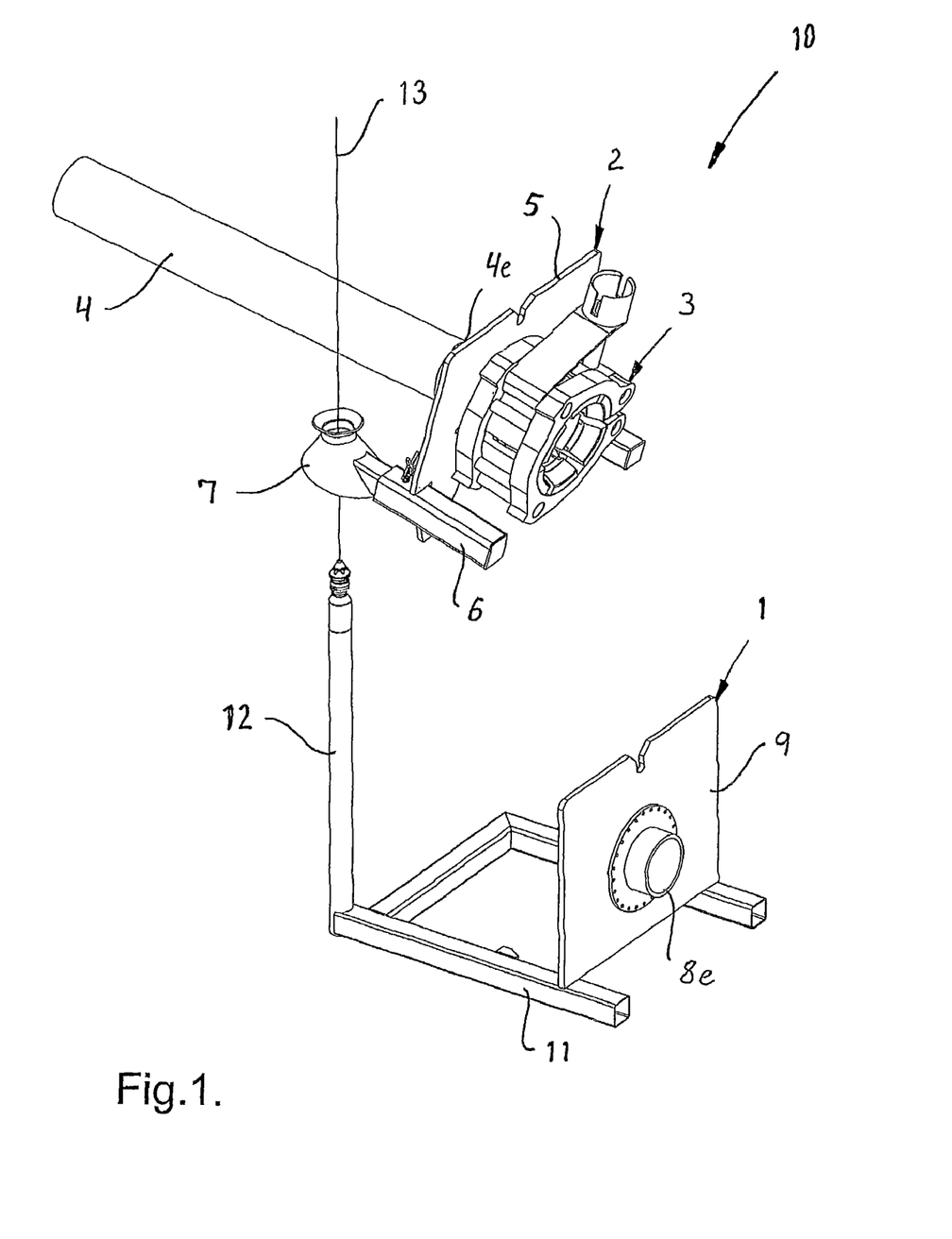
FIG. 1 shows in perspective view a first embodiment of a connecting device according to the present invention during a mating operation.
Figure 2:
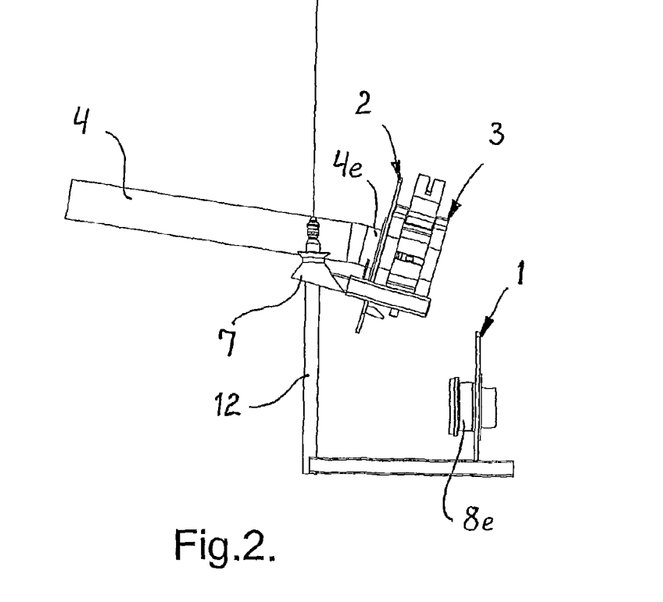
FIG. 2 shows a side view of the connecting device according to FIG. 1 where the second connecting part is partly lowered into the first connecting part.

A lowering operation of the second connecting part 2 towards the first connecting part 1 will now be described with reference to the FIGS. 2-5. FIG. 2 shows the instant when the second connecting part 2 is mating with the first connecting part 1 in that the funnel like means 7 initially enters the top of the guide post 12.

Figure 3:
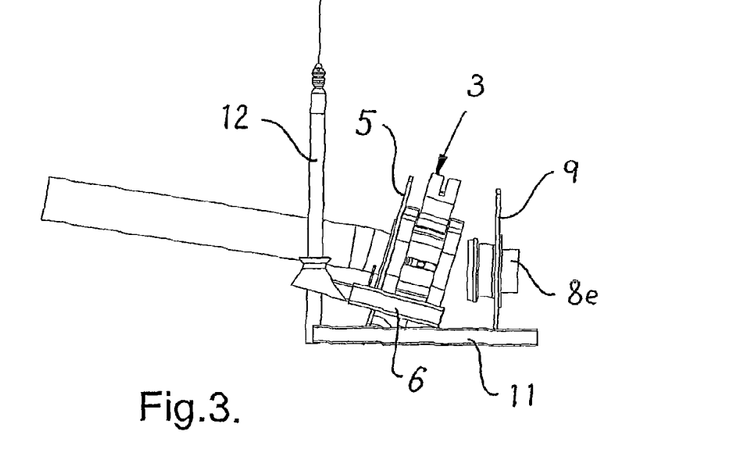
FIG. 3 shows a side view of the connecting device according to FIG. 1 where the second connecting part is lowered further into the first connecting part.
Figure 4:
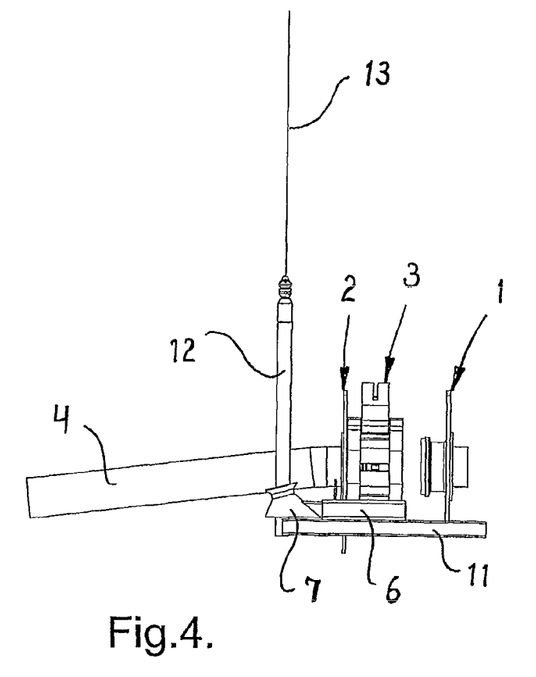
FIG. 4 shows a side view of the connecting device according to FIG. 1 where the second connecting part is completely lowered into the first connecting part.

FIG. 3 shows the instant when the second connecting part 2 abuts the frame structure 11 on the first connecting part 1. The funnel like means 7 is guided nearly all the way down on the guide post 12. In inclined position, the projecting bar 6 hits the frame structure 11. It is the outer end 6e of the bar 6 that hits first. By further lowering of the funnel like means 7, the bar 6 will, in a sliding way, cooperate with the frame structure 11 of the first connecting part 1. The opening in the funnel like means 7 is spacious relative to the diameter of the guide post 12, which provides motional freedom to the funnel like means 7 relative to the post 12. As the sliding cooperation between the bar 6 and the frame structure 11 proceeds, the second connecting part 2 pivots and thus the pipe end. When the bar 6 is laying parallel to the frame structure 11, as shown in FIG. 4, the pipe ends align and thus the pipelines do.

Figure 5:
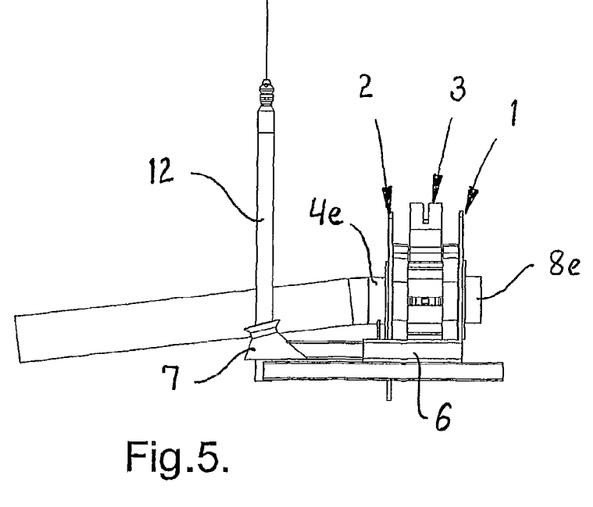
FIG. 5 shows a side view of the connecting device according to FIG. 1 where the second connecting part is displaced towards the first connecting part, and ready to activate the very connector before final connection.
Figure 6:
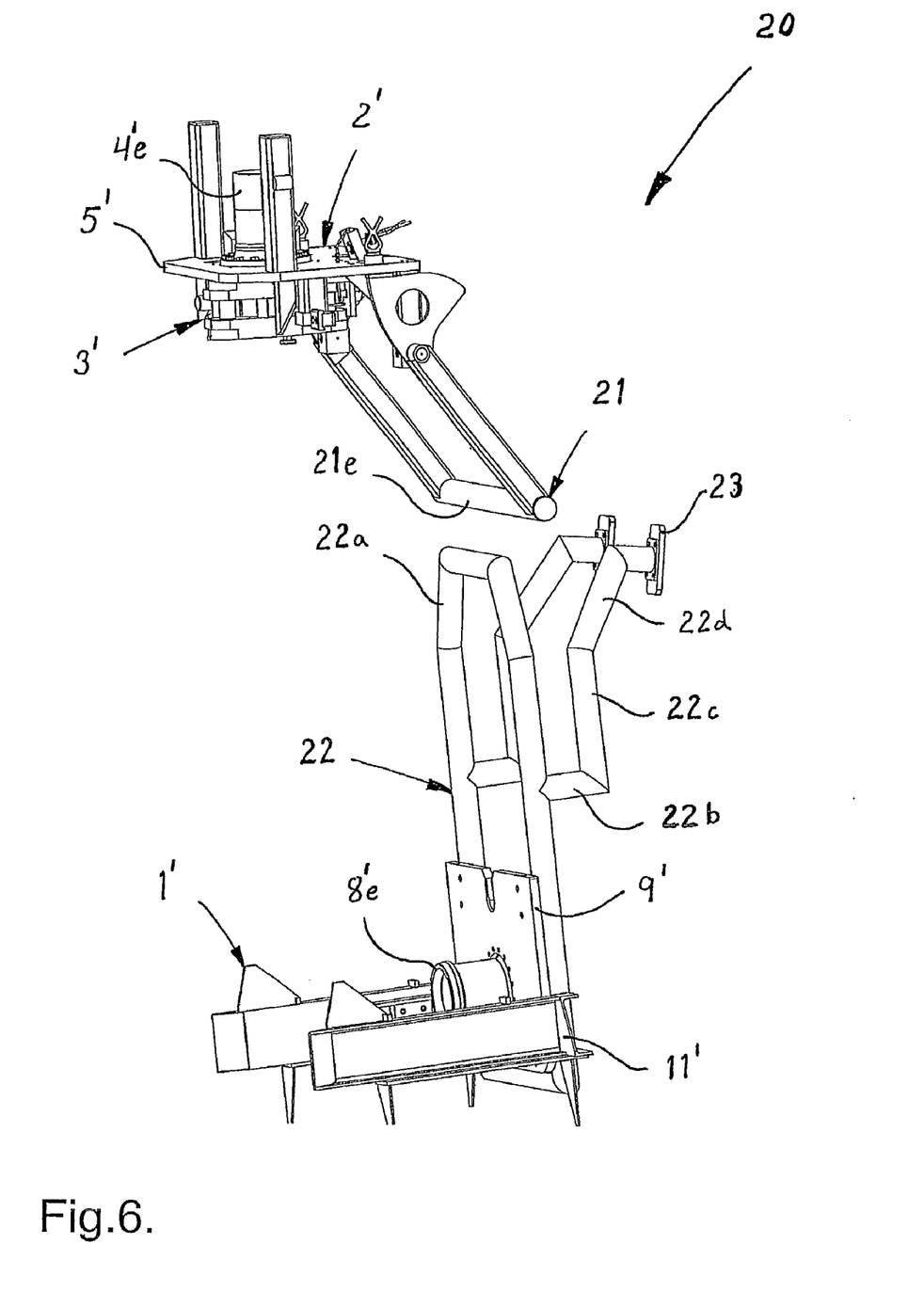
FIG. 6 shows in perspective view a second embodiment of a connecting device according to the present invention during a mating operation.

FIG. 5 shows that the second connecting part 2, as a second last step, can be driven towards the first pipe end 8e. Last step is to activate the connector 3 and perform final connection between the pipe ends 4e and 8e.

In the illustrated embodiment, the connector 3 is shown as an integrated part of the second connecting part 2. However, it is to be understood that the connecting device 10, as a variant, can have the connector 3 as an integrated part of the first connecting part 1.

It is further to be understood that as a third variant the connector 3 can be a separate unit that is installed after the pipe ends are aligned and brought in position adjacent to each other.

With reference to the FIGS. 6-10, a second embodiment of the connecting device according to the invention, will now be described and has been generally given the reference number 20. Those parts of the connecting device 20 that correspond to the same ones in the first embodiment have been given the same reference number with the addition of a mark '. As in the first embodiment, the connecting device 20 consists of two main parts, the first connecting part 1' and the second connecting part 2', in addition to a connector 3'. As before, the intention is that the entire connecting device 20 is left alone on the seabed when the connecting operation between the two pipelines is completed. The pipelines can be rigid or flexible.

In the illustrated variant, the connector 3' is secured to the second connecting part 2' and constitutes per se an integrated part of the second connecting part 2'. The second connecting part 2' also includes a second pipe end 4'e which is the end of a second pipeline (not shown). The pipe end 4'e is secured to a rigid and robust plate part 5' that the connector 3' also is fixed to. The plate part 5' is substantially perpendicular to the central axis of the pipe end 4'e.

In addition, the second connecting part 2' has forced motion means in the form of a projecting bail structure 21 which is rigidly connected to the plate part 5'. The bail structure 21 is spaced apart from the pipe end 4'e and extends by an angle relative to the central axis of the pipe end 4'e. The bail structure 21 constitutes a guiding means in a first phase of the mating.

The first connecting part 1' has a first pipe end 8'e which is the end of the first pipeline (not shown). The pipe end 8'e is secured to a rigid and robust plate part 9' which in turn is secured to a rigid and robust frame structure 11'. In use the frame structure 11' normally is horizontally positioned. The plate part 9' is substantially perpendicular to the frame construction 11' and the central axis of the pipe end 8'e.

The first connecting part 1' that rigidly retains the first pipe end 8'e of the first pipeline includes a guide structure in the form of an upwardly projecting frame structure 22 that by its top part 22a is able to receive the bail structure 21 provided on the second connecting part 2'.

The frame structure 22 is placed and secured to the frame structure 11' at a distance from the pipe end 8e. The frame structure 22 extends substantially vertical and parallel to the plane through the plate part 9'. The frame construction 22 has a branch 22b which extends substantially horizontal. This continuous in a frame extension 22c that extends substantially vertically and parallel to the upwardly projecting top part 22a of the frame structure 22. Further, an inclined part 22d makes a bend out from the frame extension 22c and may form mounts 23 to a subsea structure.

Figures 7, 8:
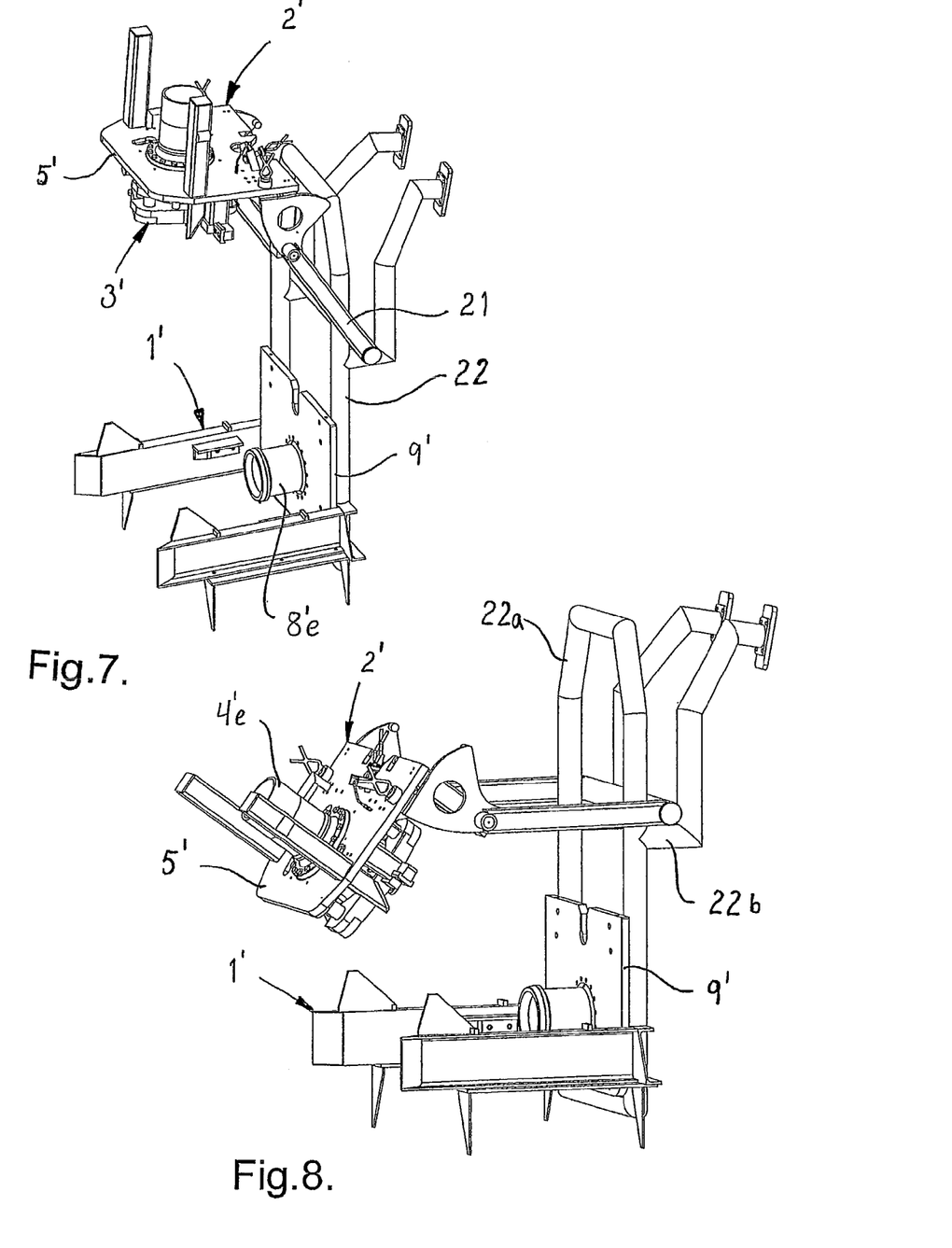
FIG. 7 shows in perspective view the connecting device according to FIG. 6 where the second connecting part is partly lowered into the first connecting part.
FIG. 8 shows in perspective view the connecting device according to FIG. 6 where the second connecting part is lowered further into the first connecting part.
Figure 9:
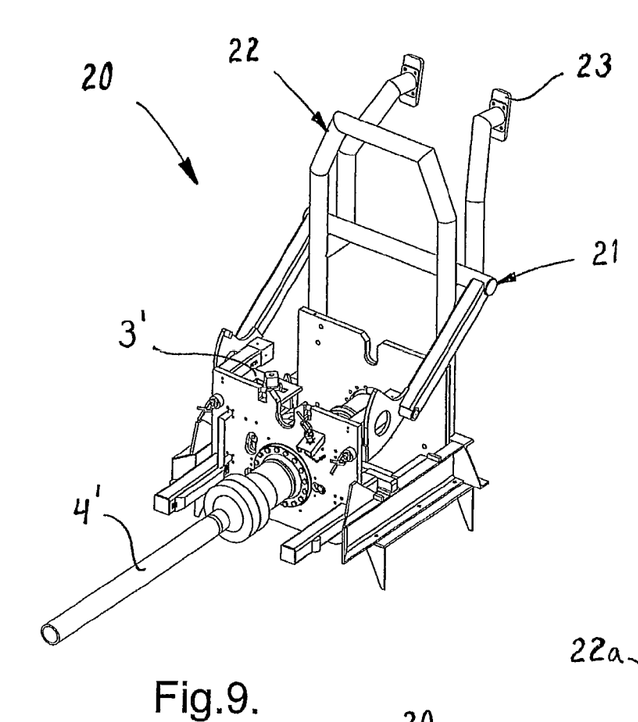
FIG. 9 shows in perspective view the connecting device according to FIG. 6 where the second connecting part is lowered completely into the first connecting part.

A lowering operation of the second connecting part 2' towards the first connecting part 1' will now be described with reference to the FIGS. 7-10. FIG. 7 shows the situation when the second connecting part 2' is entering the first connecting part 1' in that the bail structure 21 is guided over the top part 22a of the upwardly projecting frame structure 22. FIG. 7 shows the instant when the second connecting part 2' abuts the first connecting part 1'. The bail structure 21 is guided nearly all the way down towards the branch 22b in the frame structure 22. It is the outer end 21e of the bail structure 21 that hits first. By further lowering of the second connecting part 2' the bail structure 21 will cooperate with the frame structure 22 of the first connecting part 1'. As the second connecting part 2' is descending, this second connecting part 2' is pivoted, and thus also the pipe end, about the point of the branching 22b. This is clearly shown in FIG. 8. When the bail structure 21 has pivoted all the way down, as shown in FIG. 9, the pipe ends 4'e, 8'e are aligned and thus the pipelines 4' are aligned.

Figure 10:
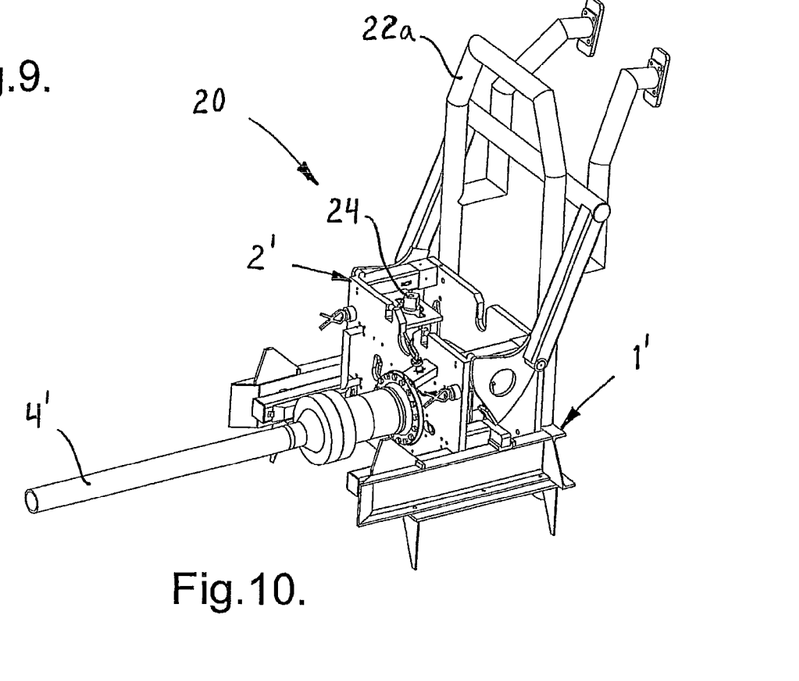
FIG. 10 shows in perspective view the connecting device according to FIG. 6 where the second connecting part is displaced towards the first connecting part, and ready to activate the very connector before final connection.

FIG. 10 shows that the second connecting part 2', as a second last step, can be driven towards the first pipe end 8'e. Last step is to activate the connector 3' and perform final connection between the pipe ends 4'e and 8'e. This may for example take place by means of a ROV that has a tool able to turn a square 24 on the connector 3' pulling the connector together in a known way.

In the illustrated embodiment, the connector 3' is shown as an integrated part of the second connecting part 2'. However, it is to be understood that the connecting device 20, as a variant, can have the connector 3' as an integrated part of the first connecting part 1'.

It is further to be understood that as a third variant the connector 3' can be a separate unit that is installed after the pipe ends are aligned and brought in position adjacent to each other.

FIGS. 11-15 show a third embodiment of the connecting device 30 with use of two guide lines 31, in particular intended for flexible pipelines. This can be considered as a variant of the embodiment according to FIG. 1-5. Those parts of the connecting device 30 that correspond with those of the first embodiment 10 have been given the same reference numbers with the addition of a double mark ".

With reference to the FIGS. 11-15, a third embodiment of the connecting device according to the invention, will now be described and has been generally given the reference number 30. As above, the connecting device 30 consists of two main parts, the first connecting part 1" and the second connecting part 2", in addition to a connector 3". Still the intention is that the entire connecting device 30 is left alone on the seabed when the connecting operation between the two pipelines is completed. The pipelines will normally be flexible.

In the illustrated variant, the connector 3" is secured to the second connecting part 2" and constitutes per se an integrated part of the second connecting part 2". The second connecting part 2" also includes a second pipe end 4"e which is the end of a second pipeline 4". The pipe end 4"e is secured to a rigid and robust plate part 5" that also the connector 3" is fixed to. The plate part 5" is substantially perpendicular to the centre axis of the pipe end 4"e.

Figure 14:
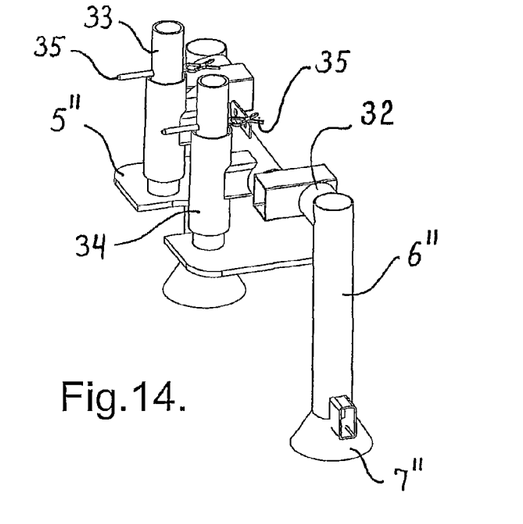
FIG. 14-15 show in closer detail a connecting part having hinged and releasable connection.
Figure 15:
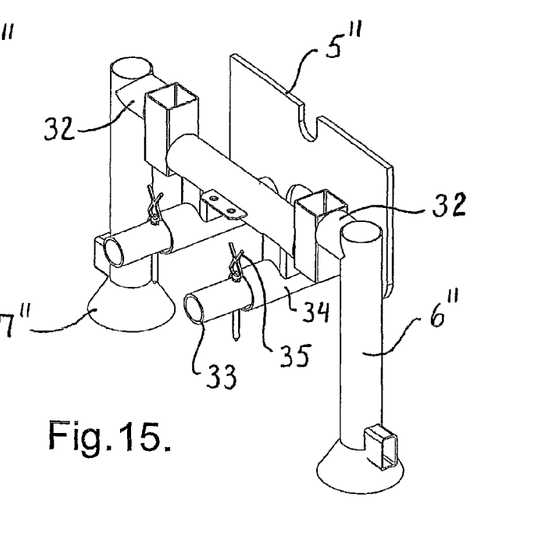

This embodiment of the second connecting part 2" has hinged connection between the plate part 5" and the guiding means, as shown in detail in the FIGS. 14 and 15. This takes place via two axle stubs 32. The guiding means are in the form of guide tubes 6" and funnel like means 7". Each guide tube 6" acts as guiding means along a guide line 31, or wire, that is in connection with a surface vessel (not shown). Further, the funnel like means 7" acts as guide when the second connecting part 2" is entering the first connecting part 1".

Figure 11:
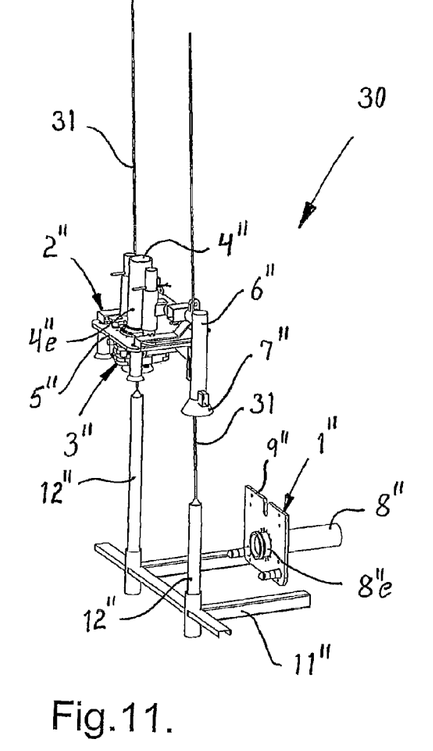
FIG. 11-13 show three sequences in perspective view of the third embodiment of a connecting device according to the present invention during a mating operation.
Figure 12:
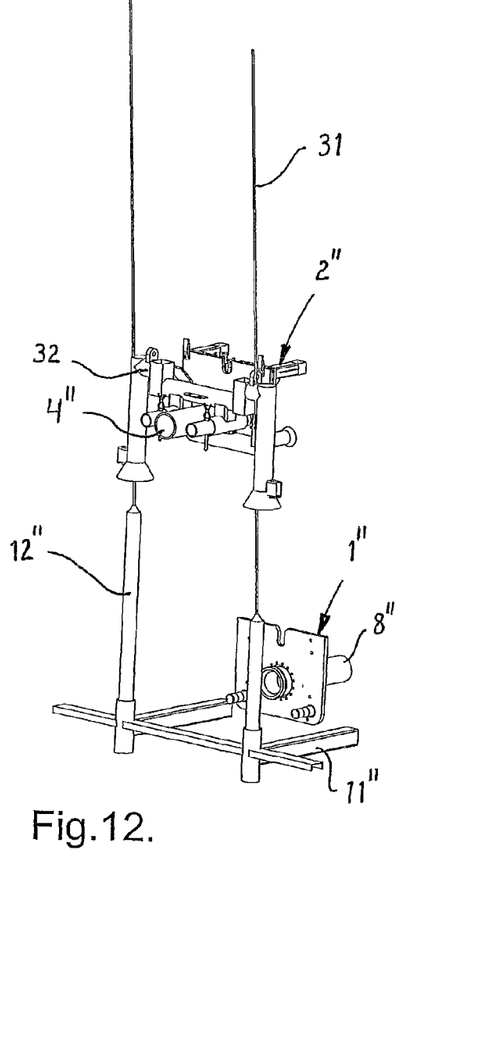
Figure 13:
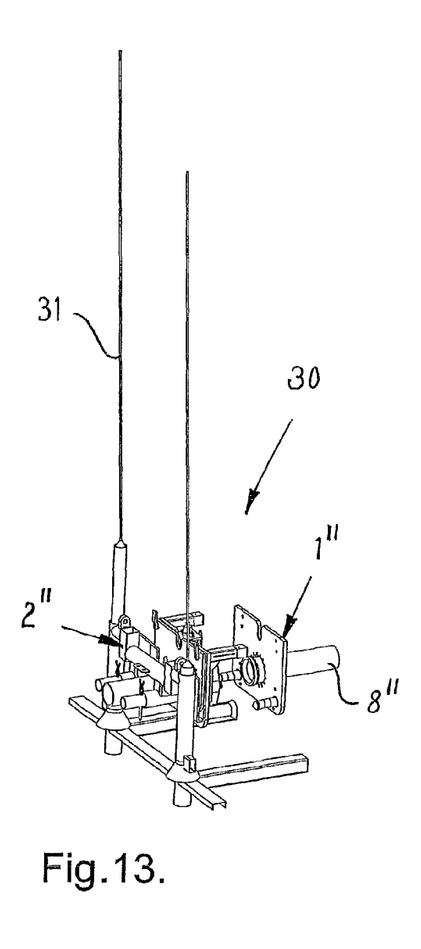

The first connecting part 1" includes a first pipe end 8"e which is the end of the first pipeline 8". The pipe end 8"e is secured to a rigid and robust plate part 9" which in turn is secured to a rigid and robust frame structure 11". The plate part 9" is substantially perpendicular to the longitudinal extension of the frame structure 11" and the central axis of the pipe end 8"e. The first connecting part 1" that rigidly retains the first pipe end 8"e of the first pipeline 8" includes two upwardly projecting guide structures in the form of guide posts 12" that are located and secured to the frame structure 11" at a distance from the pipe end 8"e. The guide posts 12" extend substantially vertically and in parallel with the plane through the plate part 9".

What in the main distinguish this embodiment from the connecting device 10 is firstly that two substantially in parallel extending guide lines 31 are used from the surface and down to the first connecting part 1". This stabilizes the process and is beneficial in deeper waters and in hostile seas.

Secondly, the plate 5" is hinged connected to the guiding means 6", 7". With flexible pipelines and conditions as stated above, the connecting part 2" and the pipeline 4" will be lowered substantially vertical towards the seabed from a surface vessel. When the second connecting part 2" approaches the seabed and thus the first connecting part 1", the vessel can commence its motion in the laying direction. As the vessel moves, the plate part 5" with the pipe end 4" will gradually be tilted over via the hinges 32 and the pipeline is laid along the seabed. The guide means 6", 7" are kept vertical by means of the guide lines 31, or guide posts 12", according to how deep the second connecting part 2" is lowered.

Thirdly, the guiding means 6", 7" are detachably secured to the plate 5". This is clearly illustrated in FIGS. 14 and 15. This can take place in that the plate 5" has two projecting pins 33 that extend through two corresponding pipe parts 34 fixed to the guide means 6", 7". The pins 33 are loosely connected to the pipe parts 34 by means of locking pins 35 which in turn can be pulled out in order to release the parts from each other. Thus the guiding means 6", 7" can be released and retrieved up to the surface again to be reused. This feature and possibility is a question of costs—component costs contra time costs.

The invention claimed is:

1. A connecting device for mating and making up a connection on the seabed of a first and a second pipeline having first and second pipe ends at the connection site, comprising:
    a first connecting part retaining the first pipe end of the first pipeline, which first connecting part and first pipeline are designed to be lowered and deployed on the seabed in advance, and the first connecting part comprises a guiding structure that is spaced apart from the pipe end, and
    a second submersible connecting part retaining the second pipe end of the second pipeline, the second connecting part and second pipeline configured to be lowered from the surface of the water towards the first connecting part,
    wherein the second connecting part comprises guiding means spaced apart from the pipe end, and
    wherein the connecting parts comprise means that cooperate during relative motion between said connecting parts, and hingedly tilts the second connecting part by means of forced motion, and thus aligning the second pipe end in the direction toward the first pipe end such that the first and second pipelines are brought to be in line with each other on the seabed, and
    a connector arranged between the first and second connecting parts for final connection between the pipeline ends.

2. The connecting device according to claim 1, wherein the guiding structure is a guide post optionally connected to a surface vessel via a guide line, said guide post being able to receive a corresponding guide means arranged on the second connecting part.

3. The connecting device according to claim 1, wherein the forced motion means on the second connecting part comprises a projecting bar which, in a slidable way, cooperates with a frame part on the first connecting part, said sliding cooperation tilts the second connecting part and thus the pipe end towards alignment of the pipelines.

4. The connecting device according to claim 2, wherein the forced motion means on the second connecting part comprises the said guiding means and the guiding means is fixedly connected to the projecting bar which, in a slidable way, cooperates with said frame part.

5. The connecting device according to claim 1, wherein the forced motion means on the second connecting part is fixedly connected to the second pipe end via a plate part that is secured substantially normally to the central axis of the pipe end.

6. The connecting device according to claim 1, wherein the guiding structure is an upwardly projecting frame structure that is able to receive a corresponding guide means arranged on the second connecting part.

7. The connecting device according to claim 6, wherein the forced motion means on the second connecting part comprises a projecting bail structure which, in an initial phase, in a slidable way cooperate with the upwardly projecting frame structure on the first connecting part, and when the bail structure is completely introduced into and bottoms against a part of the upwardly projecting frame structure, the second connecting part and thus the pipe end tilt in the direction towards alignment of the pipelines.

8. The connecting device according to claim 6, wherein the forced motion means on the second connecting part is fixedly connected to the second pipe end via a plate part that is secured substantially perpendicular to the central axis of the pipe end.

9. The connecting device according to claim 1, wherein the connector constitutes an integrated part of the connecting device, the connector being secured on the second connecting part and the second connecting part is displaceable in a direction towards and away from the first connecting part, said pipe ends thus are positioned before final connection of the pipe ends by said connector.

10. The connecting device according to claim 2, wherein the connector constitute an integrated part of the connecting device, the connector being secured on the first connecting part and the second connecting part is displaceable in a direction towards and away from the first connecting part, said pipe ends thus are positioned before final connection of the pipe ends by said connector.

11. The connecting device according to claim 3, wherein the connector constitute an integrated part of the connecting device, the connector being secured on the second connecting part and the first connecting part is displaceable in a direction towards and away from the second connecting part, said pipe ends thus are positioned before final connection of the pipe ends by said connector.

12. The connecting device according to claim 4, wherein the connector constitute an integrated part of the connecting device, the connector being secured on the first connecting part and the first connecting part is displaceable in a direction towards and away from the second connecting part, said pipe ends thus are positioned before final connection of the pipe ends.

13. The connecting device according to claim 1, wherein the connector constitute a separate unit that can be lowered down between the pipe ends after the pipe ends are coarsely positioned and aligned relative to each other.

14. The connecting device according to claim 1, wherein at least one of the connecting parts comprises orienting means that are able to turn the second connecting part in the horizontal plane to coarsely align the second connecting part in respect of the first connecting part such that the pipe ends thus are brought substantially in line before lowering of the second connecting part along said guide post.

15. The connecting device according to claim 1, wherein the second connecting part comprises a plate part, and
wherein the guiding means are hingedly connected to the plate part.

16. The connecting device according to claim 2, wherein the forced motion means on the second connecting part comprises a projecting bar which, in a slidable way, cooperates with a frame part on the first connecting part, said sliding cooperation tilts the second connecting part and thus the pipe end towards alignment of the pipelines.

17. The connecting device according to claim 3, wherein the forced motion means on the second connecting part comprises the said guiding means and the guiding means is fixedly connected to the projecting bar which, in a slidable way, cooperates with said frame part.

18. The connecting device according to claim 2, wherein the forced motion means on the second connecting part is fixedly connected to the second pipe end via a plate part that is secured substantially normally to the central axis of the pipe end.

19. The connecting device according to claim 3, wherein the forced motion means on the second connecting part is fixedly connected to the second pipe end via a plate part that is secured substantially normally to the central axis of the pipe end.

20. The connecting device according to claim 4, wherein the forced motion means on the second connecting part is fixedly connected to the second pipe end via a plate part that is secured substantially normally to the central axis of the pipe end.

* * * * *